United States Patent
Reeves

(10) Patent No.: US 6,368,368 B1
(45) Date of Patent: Apr. 9, 2002

(54) STRATIFICATION RESISTANT EMULSIONS

(75) Inventor: Russell Robert Reeves, Dungog (AU)

(73) Assignee: Apace Research Limited, Dungog (AU)

( * ) Notice: Subject to any disclaimer, the term of this patent is extended or adjusted under 35 U.S.C. 154(b) by 0 days.

(21) Appl. No.: 09/485,158

(22) PCT Filed: Aug. 5, 1998

(86) PCT No.: PCT/AU98/00614

§ 371 Date: Feb. 4, 2000

§ 102(e) Date: Feb. 4, 2000

(87) PCT Pub. No.: WO99/07464

PCT Pub. Date: Feb. 18, 1999

(30) Foreign Application Priority Data

Aug. 5, 1997 (AU) .............................................. PO8410

(51) Int. Cl.[7] ................................................. C10L 1/32
(52) U.S. Cl. .......................................... 44/301; 44/302
(58) Field of Search .................................. 44/301, 302

(56) References Cited

U.S. PATENT DOCUMENTS

| | | | |
|---|---|---|---|
| 4,482,666 A | * 11/1984 | Reeves | 524/389 |
| 4,508,873 A | * 4/1985 | Reeves | 525/91 |
| 4,915,708 A | * 4/1990 | Prevedello et al. | 44/281 |
| 5,484,851 A | 1/1996 | Fock | 525/333.5 |

FOREIGN PATENT DOCUMENTS

| AU | 12388 B | * 9/1983 |
|---|---|---|
| AU | B-12388/83 | 9/1983 |
| AU | B-24141/88 | 5/1989 |

* cited by examiner

Primary Examiner—Margaret Medley
(74) Attorney, Agent, or Firm—Christie, Parker & Hale, LLP

(57) ABSTRACT

Emulsions containing a hydrocarbon liquid in a continuous phase and alcohol and/or water in a dispersed phase are provided. The emulsions are stabilized by an emulsifier and a coupling agent. The emulsifier is a copolymer containing at least one relatively hydrophobic polymeric block of styrene or a ring substituted styrene monomer, and at least one relatively hydrophilic polymeric block of at least one monomer, such as ethylene oxide, selected from the group having the formula $H(O-R)_nOH$, where R is an aliphatic radical containing from 1 to 4 carbon atoms and n is a number between 20 and 300. The coupling agent is a copolymer containing at least one polymeric block of styrene or ring substituted styrene monomer, and at least one block being of a saturated or unsaturated aliphatic hydrocarbon moiety, such as butadiene. The emulsifier is present in an amount sufficient to form micelles of the relatively hydrophilic polymer block sufficient to contain the dispersed phase and the coupling agent is present in an amount that is sufficient to substantially prevent the dispersed phase droplets from coalescing while not being present in a sufficiently high amount that micelles of the styrene containing polymeric blocks of the coupling agent form in the continuous phase of the emulsion.

26 Claims, 2 Drawing Sheets

STRATIFICATION RESISTANT EMULSIONS

CROSS-REFERENCE TO RELATED APPLICATION

This application is a national stage entry under 35 U.S.C. § 371 of PCT/AU98/00614, filed Aug. 5, 1998.

TECHNICAL FIELD

The present invention relates to emulsions containing alcohol and/or water in a dispersed phase and a hydrocarbon liquid in the continuous phase. More particularly the present invention relates to such emulsions that are resistant to stratification on relatively long term undisturbed storage at ambient temperature.

BACKGROUND ART

It is known from the applicant's Australian patent specification 544.728 that emulsions containing alcohol and/or water in one phase and a hydrocarbon liquid in the other may be formed using an emulsifier that is a block copolymer of ethylene oxide and styrene type monomers. These emulsions are of particular utility as liquid transport fuel in which hydrated methanol or hydrated ethanol is dispersed in diesel oil or gasoline. Hydrated alcohol in diesel oil (termed AW/D) emulsions represent a new and potentially cost effective option for significantly reducing particulate and NOx emissions from diesel engines. Emulsions of hydrated alcohol in gasoline exhibit reduced vapour pressure, increased water tolerance and reduced NOx emission on combustion as compared with anhydrous alcohol solutions in gasoline. When the alcohol is ethanol produced from biomass there can be a reduction in the net emission of carbon dioxide ("greenhouse gas") as compared with the use of unblended petroleum fuel.

The arrangement described in the above mentioned specification utilised not only a block copolymer as the emulsifier but also a block copolymer as a coupling agent. The coupling agent typically comprised a block copolymer of butadiene and styrene type monomers and was described as containing butadiene and styrene in weight ratios of at least 2:1, preferably at least 3:1. The emulsifier and the coupling agent are described in that specification as being present in the emulsion in a ratio of from 1:3 to 3:1. In these ratios solutions of the two copolymers are compatible.

It has been found that while the AW/D emulsions described in the aforementioned Australian patent specification produce generally stable emulsions they do suffer from a problem of stratification, i.e., a tendency for the dispersed or discontinuous phase droplets to rise if they are less dense than the continuous phase of the emulsion, called 'creaming', or to fall if they are more dense than the continuous phase, called 'settling'. While this stratification may take a relatively long time and may be readily reversed by gentle agitation it is a major commercial disadvantage as there is the possibility that any given aliquot of emulsion may, after a period of relatively long-term undisturbed storage, contain more or less of the dispersed phase component than is intended. In the case of an emulsion used as a fuel such stratification makes the starting and/or running of an engine difficult, if not impossible.

DISCLOSURE OF INVENTION

The present invention relates to emulsions containing in a continuous phase a hydrocarbon liquid and in a dispersed phase alcohol and/or water in the presence of:

(a) an emulsifier being a copolymer containing at least one relatively hydrophobic polymeric block of at least one monomer selected from the group comprising styrene and ring substituted styrenes, and at least one relatively hydrophilic polymeric block of at least one monomer selected from the group having the formula $H(O-R)_n OH$ where R is an aliphatic radical containing from 1 to 4 carbon atoms and n is a number between 20 and 300, and (b) a coupling agent being a copolymer containing at least one polymeric block of at least one monomer selected from the group comprising styrene and ring substituted styrenes, and at least one block being a saturated or unsaturated aliphatic hydrocarbon moiety, the emulsifier being present in an amount sufficient to form micelles of the relatively hydrophilic polymer block sufficient to contain the dispersed phase and the coupling agent being present in an amount that is sufficient to substantially prevent the dispersed phase droplets from coalescing while not being present in a sufficiently high amount that micelles of the styrene containing polymeric blocks of the coupling agent form in the continuous phase of the emulsion.

The absolute amounts of the emulsifier and the coupling agent can be determined for any given emulsifier and coupling agent by quantitative testing. It is apparent to the present inventor that the amount of the coupling agent in the emulsion is important and typically approaches the solubility limit of the coupling agent in the continuous phase. If the amount of the coupling agent is lower than the critical amount it will not couple effectively with the micelles of the emulsifier and therefore stratification of the dispersed phase of the emulsion will not be inhibited. If the amount of the coupling agent is higher than the critical amount it will form micelles of the styrene containing polymeric blocks of the coupling agent which will in turn cause flocculation of the dispersed phase to occur. The solubility of the coupling agent in the continuous phase can be adjusted by an alteration of the amount of the styrene moiety relative to the hydrocarbon moiety in the coupling agent. The solubility will also depend to some extent upon the aromaticity of the hydrocarbon liquid comprising the continuous phase. The more aromatic is the hydrocarbon liquid the higher will be the solubility of any given coupling agent.

The maximum amount of emulsifier is not as critical as the maximum amount of the coupling agent as, within reasonable limits, the presence of an excess of emulsifier has only an economic disadvantage and not a technical one. The emulsifier should be present in an amount greater than 3 times the amount of the coupling agent as is described in more detail later in this specification. Preferred amounts of the coupling agent in the emulsion are in the range of from 0.75 to 1.5 gm/l. When the dispersed phase is hydrated methanol it is preferred that the coupling agent is present in the emulsion in the range of from 0.75 to 1.0 gm/l whereas in the case of the dispersed phase comprising hydrated ethanol the preferred range is from 1.0 to 1.5 gm/l.

In total the copolymer content of the emulsion, i.e. the combined amount of the emulsifier and of the coupling agent, is preferably in the range of from 4 to 10 gm/l. In the case of emulsions containing hydrated methanol in an amount of 12% by volume in the dispersed phase the preferred amount of copolymers is 4 to 6 gm/l, more preferably 5 gm/l, and in the case of emulsions containing hydrated ethanol in an amount of 15% by volume in the dispersed phase the preferred concentration of copolymers is 5 to 8 gm/l, more preferably 6 gm/l. In the case of emulsions that contain greater amounts of alcohol and/or water in the dispersed phase the preferred amount of the copolymers will typically remain less than 10 gm/l, however in this case the ratio of the emulsifier to the coupling agent will rise. This is because, as the amount of the dispersed phase increases so the quantity of emulsifier required increases in proportion to the increase in the surface area of the dispersed phase of the emulsion; by contrast, the quantity of coupling agent stays substantially constant as the amount of the dispersed phase increases.

As used in this specification the following terms have the meanings indicated:

| | |
|---|---|
| Alcohol: | This term means methanol or ethanol or mixtures thereof and |
| Hydrocarbon liquid: | This term includes all liquid fractions obtained from petroleum crude oil and synthetic liquid hydrocarbons obtained from the processing of gaseous or solid hydrocarbons. |

The hydrocarbon liquid is preferably selected from the group comprising gasolines, kerosenes, diesel oils, gas oils and fuel oils. The gasolines are liquid hydrocarbons boiling below 190° C. The kerosenes, diesel oils and gas oils boil between 170° and 480° C., while the fuel oils boil above 450° C.

The hydrocarbon liquid is preferably selected from the gasolines, the kerosenes which boil between 170 and 230° C., the diesel oils which boil from 170 to 315° C. and the gas oils that boil from 315 to 480° C. The invention is particularly applicable to the high boiling point kerosenes, the diesel oils and the low boiling point gas oils when the dispersed phase comprises a hydrated alcohol. In the case where the dispersed phase comprises only water the preferred hydrocarbon liquid is selected from the diesel oils, the gas oils, the fuel oils and the hydrocarbon liquids boiling above 480° C.

The dispersed phase of the emulsions preferably comprises a hydrated alcohol, which preferably contains from 0.1 to 10% by volume of water. The dispersed phase is preferably methanol or ethanol, or mixtures thereof, together with water.

The proportions of alcohol and/or water to hydrocarbon liquid may vary over wide limits. For alcohol containing emulsions, a hydrated alcohol content of between 10 and 30% by volume is preferred.

The emulsifier is preferably a copolymer containing at least one polymeric block of at least one monomer selected from the group comprising styrene and ring substituted styrenes and at least one polymeric block of at least one monomer selected from the group having the formula $H(O-R)_n OH$, where R is an aliphatic bivalent hydrocarbon radical containing from 1 to 4 carbon atoms and n is a number between 20 and 300, more preferably between 22 and 130. The emulsifier is preferably a pure di-block copolymer or a reaction mixture containing principally di-block copolymer and tri-block copolymer having two blocks of the styrene monomer, together with some unreacted homopolymer of the $H(O-R)_n OH$ monomer.

In a particularly preferred embodiment of the present invention the emulsifier is a polyethylene oxide-polystyrene copolymer. The polyethylene oxide block is preferably formed first with a molecular weight of between 1,000 and 10,000. The polyethylene oxide and the polystyrene are preferably present in a weight ratio of 1 part of polyethylene oxide to from 0.8 to 1.5 parts of polystyrene, more preferably from 1.0 to 1.25 parts of polystyrene. In preferred embodiments of the invention the emulsifier is produced by the reaction of styrene monomer with polyethylene oxide homopolymer in the presence of a free radical initiator. The reaction product formed without chain transfer agents, comprising polyethylene oxide-polystyrene di-block copolymer . . . polystyrene-polyethylene oxide-polystyrene tri-block copolymer, unreacted polyethylene oxide homopolymer and a minor proportion of various other higher molecular weight dimeric and trimeric species and polystyrene homopolymer, is particularly suitable for use in the present invention.

The coupling agent is preferably a copolymer containing at least one polymeric block of at least one monomer selected from the group comprising styrene and ring substituted styrenes and at least one polymeric block of at least one compound selected from the group comprising saturated or unsaturated aliphatic hydrocarbons, preferably butadiene or isoprene. Alternatively the hydrocarbon may comprise a single long chain hydrocarbon moiety rather than a polymer made up of a plurality of recurring monomeric entities. The coupling agent is preferably a pure diblock copolymer or a tapered block copolymer. Such copolymers are preferably produced by anionic solution polymerisation as this technique produces copolymers with a defined structure and a narrow molecular weight distribution. It is preferred that the coupling agent contains styrene and the aliphatic hydrocarbon in the weight ratio of from 1:0.3 to 1:1, most preferably from 1:0.42 to 1:0.66. These ratios are outside the range of at least 1:2 and most preferably 1:3 stated to be desirable in Australian patent specification 544.728 and lead in an opposite direction from the teaching of that specification.

The coupling agent preferably has a molecular weight of from 13,000 to 400,000, more preferably the 100,000 to 170,000, most preferably 120,000 to 150,000. It is preferred that styrene comprises from 50 to 77% by weight of the coupling agent, most preferably 50 to 70% depending on the aromatic content of the continuous phase of the emulsion. It has been found that when the aromatic content of the continuous phase is less than 22% it is preferable for the styrene content of the coupling agent to be in the range of from 50 to 60% by weight. By contrast when the aromatic content of the continuous phase is more than 23% it is preferable for the styrene content of the coupling agent to be in the range of from 60 to 70% by weight.

As has been previously described, at the preferred proportions of styrene the solubility of the coupling agent is limited in the continuous phase of the emulsion. This limited solubility encourages coupling of the styrene moieties on the emulsifier with those of the coupling agent thus preventing coalescence of the droplets in the dispersed phase of the emulsion.

It has surprisingly been found that the emulsifier and the coupling agent are desirably included in the emulsion in quite specific amounts. The emulsifier should preferably be present in such an amount that the emulsifier is able to form micelles of its relatively hydrophilic polymer (typically polyethylene oxide) block(s) in a concentration sufficient to contain the alcohol and/or water dispersed phase. The coupling agent should be present in an amount that enables it to couple with, or to form polystyrene micelles only with, the styrene moieties on the emulsifier and to thereby substantially prevent the dispersed phase droplets from coalescing, while not being present in an amount sufficient to form polystyrene micelles of the styrene containing polymeric blocks of the coupling agent itself in the continuous phase of the emulsion. This means that in preferred embodiments of the invention the emulsifier and the coupling agent will be present in a weight ratio of more than 3.0:1, preferably at least 3.5:1, and more preferably at least 4:1. It is surprising that, at these preferred ratios, solutions of the emulsifier and of the coupling agent are not compatible. These ratios are outside the range of 1:3 to 3:1 stated to be desirable in Australian patent specification 544.728 and lead in an opposite direction from the teaching of that specification.

Without being limited to the theory it is suggested that the mechanism of the present emulsification is one of steric stabilisation. It is considered that the emulsifier will form hydrophilic (typically polyethylene oxide) micelles in the continuous phase of the emulsion. The alcohol and/or water is contained within these micelles, the quantity of the alcohol and/or water that can be accommodated in the emulsion is therefor dependent upon the concentration of these micelles in the emulsion. The styrene block or blocks of the emulsifier have a limited solubility in the continuous phase but will project into the continuous phase from the micelles as their solubility is higher in the continuous phase than in the discontinuous or dispersed phase.

The coupling agent has blocks of styrene containing polymer which are only of limited solubility in the continuous phase and a hydrocarbon moiety which is of much greater solubility in the continuous phase of the emulsion. It is believed that the styrene containing polymer blocks of the coupling agent will couple with the corresponding styrene containing polymer blocks of the emulsifier to form a zone of coupling agent surrounding each micelle: If, however, the amount of coupling agent is increased above a certain concentration, then, as has been discovered by the present inventor, in addition to coupling with the emulsifier the coupling agent molecules will couple with themselves to form polystyrene micelles. If this happens then rather than acting to maintain a sub-micron dispersion of alcohol and/or water droplets the coupling agent unexpectedly acts to flocculate the dispersed phase, forming comparatively large sized droplets. The presence of the coupling agent is however essential to the maintenance of the sub-micron size dispersion of alcohol and/or water droplets. In the absence of the coupling agent the micelles of emulsifier flocculate, as the styrene containing polymer blocks of the emulsifier in adjacent micelles couple together.

The dispersed phase droplets behave in accordance with Stokes Law and may stratify in the emulsion in accordance with the number of droplets, the droplet diameter, the relative density of the dispersed and continuous phases of the emulsion and the viscosity of the continuous phase. The stratification, which is manifest either as creaming, where the dispersed phase rises in the continuous phase, or settling, where the dispersed phase sinks in the continuous phase, may be prevented, or at least reduced, by the establishment of a suitable sub-micron size distribution of the dispersed phase droplets.

It is believed that the emulsifier will form hydrophilic (typically polyethylene oxide) micelles in the continuous phase of the emulsion and, provided the concentration of these micelles is above the necessary minimum concentration for the volume of alcohol and/or water to be incorporated into the emulsion, will contain the alcohol and/or water inside the micelles to form the dispersed phase. It is believed that these initially formed dispersed phase droplets are of a sufficiently small size that they are not susceptible to stratification. It is further believed that if that these initially formed dispersed phase droplets can be prevented from coalescing or agglomerating the emulsion will remain resistant to stratification. If the coupling agent is present in a sufficient amount to couple with the styrene polymer blocks of the emulsifier, but without the formation of micelles of its own, then the initially formed dispersed phase droplets will be held apart and will not be able to couple with one another and coalesce the dispersed phase droplets. The micelles of the emulsifier will thus be stabilised by coupling agent molecules with their styrene polymer blocks coupled to the emulsifier and their hydrocarbon blocks solvated by the continuous phase of the emulsion.

While the correct selection of the emulsifier and the coupling agent and their relative amounts are important the present inventor has found that a preferred process of forming the emulsion is also desirable. The emulsifier is preferably first dissolved in the alcohol and/or water. In order to induce dissolution of the emulsifier it may be necessary to adjust the reaction conditions used to form the emulsifier to render it more hydrophilic and/or to use an aqueous solution of an alcohol to dissolve the emulsifier. The coupling agent is preferably first dissolved in the hydrocarbon liquid. The alcohol and/or water containing the dissolved emulsifier is then added to the hydrocarbon liquid containing the dissolved coupling agent. It is preferred that the solution of the coupling agent in the hydrocarbon liquid be subjected to agitation both before and after the addition of the alcohol and/or water containing the dissolved emulsifier.

The agitation of the components to the emulsion is preferably carried out using static in-line mixers. In the case of the agitation following the addition of the alcohol and/or water containing the emulsifier to the hydrocarbon liquid containing the dissolved coupling agent it is desirable that the mixing be carried out with high shear. In preferred embodiments of the invention the agitation, combined with the selected emulsifier and coupling agent, and the use of the process according to the present invention produces emulsions with dispersed droplets having diameters in the range of from 0.1 to 2.0 microns, more preferably from 0.1 to 0.9 microns with an average diameter of about 0.5 microns.

BRIEF DESCRIPTION OF DRAWINGS

The following description of a preferred embodiment of the present invention is provided as an example of the invention and is described with reference to the accompanying drawings in which.

Figure 1:
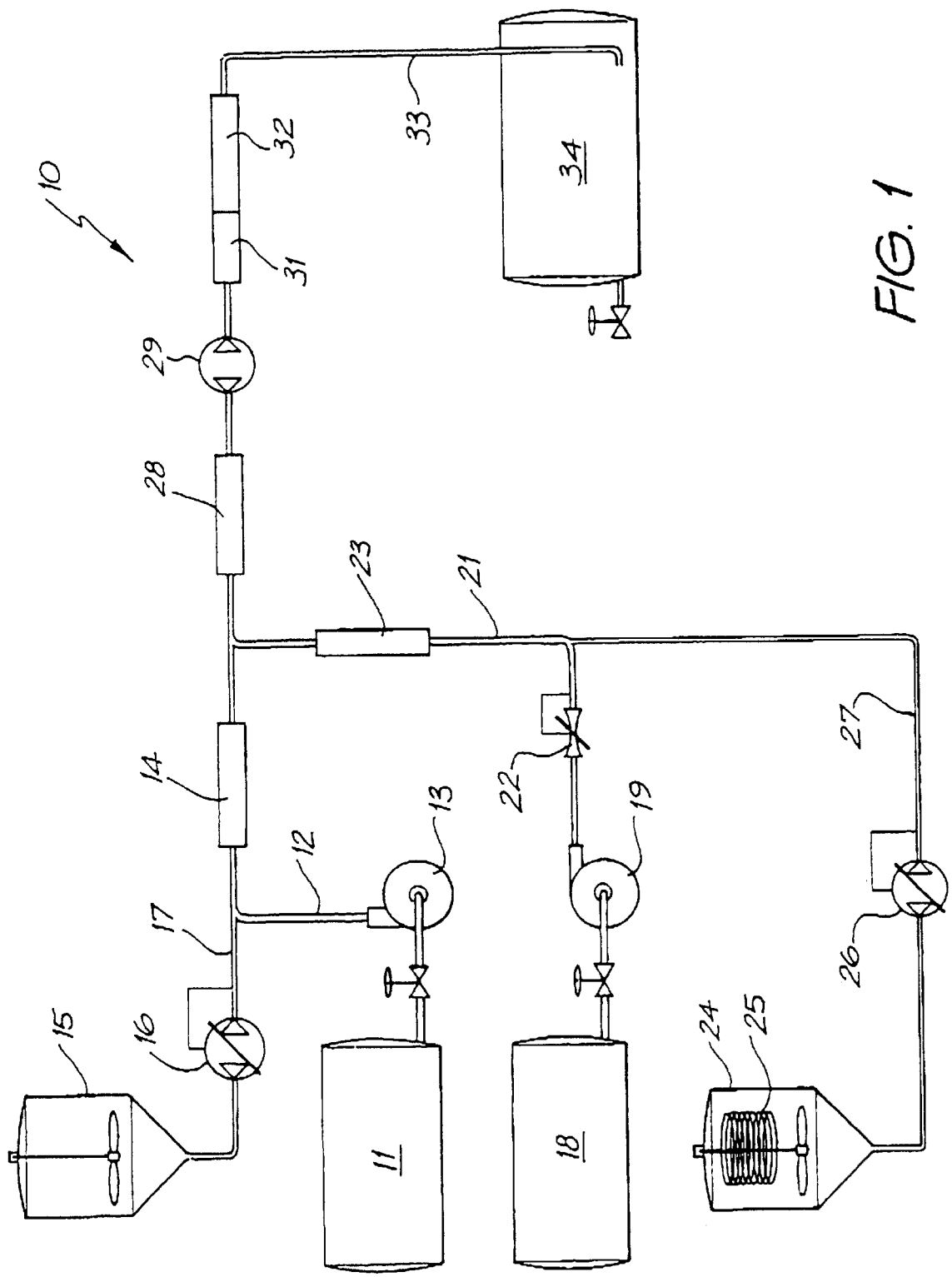
FIG. 1 is a flow diagram for a blending facility for forming emulsions according to the present invention.

BEST MODE FOR CARRYING OUT THE INVENTION (i) Production of Emulsifier

The following method was used for the production of a 3.27 tonne batch of an emulsifier which is a copolymer of polyethylene oxide and styrene. The method comprised the steps of:

a) A suitably sized reactor vessel which is compatible with the emulsifier was cleaned and dried b) The following materials were charged into the reactor vessel:

| | |
|---|---|
| Polyethylene oxide, molecular weight 1500 | 804.0 kg |
| Xylene solvent | 1120.0 kg |

The polyethylene oxide had been heated to 50–60° C. overnight and was added to the reactor vessel through the manhole.

| | | |
|---|---|---|
| c) | Styrene monomer | 804.0 kg | was charged into the reactor monomer feed headtank.

| | | |
|---|---|---|
| d) | Tertiary butyl perbenzoate free radical initiator | 116.2 kg |
| | Xylene solvent | 426.0 kg | where charged into the reactor catalyst feed headtank.

e) A gentle nitrogen flow through the reactor vessel was commenced and the agitator speed set to 40 rpm. The reactor vessel was heated by the application of full heat to the jacket of the reactor vessel.

f) When the reactor vessel temperature had reached and levelled out at 140° C. the styrene monomer from the reactor monomer feed headtank and the free radical initiator solution from the reactor catalyst headtank were simultaneously fed into the reactor vessel. The feed was continued through rotameters over a period of 12 hours.

g) The temperature set point of the reactor vessel was reduced over the 12 hour period of addition from 140° C. to 131° C. to reduce the severity of reflux. During this period the nitrogen flow was sufficient to blanket the reactor vessel but not so much as to displace refluxing xylene via the condenser catchpot. It was necessary to slow the nitrogen flow as the volume of the reactor vessel approached capacity during the final 4 hours of the monomer and catalyst feeds.

h) At the completion of the monomer and catalyst feeds the temperature of the product was held constant at approximately 130° C. for two hours and agitation of the product was continued during this period.

i) The product was then cooled to 100° C. This emulsifier solution had its solids content adjusted to about 50% by weight through the addition of xylene solvent and was then used directly in the production of emulsions. Alternatively, the majority of the xylene may be stripped off by vacuum distillation and recovered for reuse. In this case the reactor contents would be analysed for solids and the solids content adjusted to about 75% by weight through the addition of hydrated methanol to the reactor.

j) The product was then run-off to drums.

(ii) Production of Coupling Agent.

The preferred coupling agent is produced by a method known as anionic solution polymerisation. This method is widely used in commercial practice for the production of copolymers of styrene and butadiene.

In the conventional anionic solution polymerisation production process, the styrene-butadiene copolymer is usually produced in a solvent of mixed hexanes, then precipitated by the addition of water, dried and sold in solid form. In the present emulsion production application, however, it is preferred to produce the styrene-butadiene copolymer in xylene solvent and to then recover the majority of the xylene solvent and to replace it with the hydrocarbon liquid that is to form the continuous phase of the emulsion. The solids content of the reaction mixture is preferably maintained at about 15% by weight. This coupling agent solution may then be used directly in the production of emulsions.

Alternatively the coupling agent may be prepared by dissolving solid styrene-butadiene copolymer in the manner described in the following steps used to produce a six tonne batch of coupling agent:

a) A suitably sized reactor vessel which is compatible with the coupling agent was cleaned and dried.

b) The reactor vessel was charged with:

| | |
|---|---|
| Xylene solvent | 2100.0 kg | c) With the reactor vessel cool the solvent was stirred at 60 rpm. The following was then charged into the reactor vessel through the manhole:

| | |
|---|---|
| Styrene-butadiene copolymer solid crumb | 900.0 kg | d) The manhole cover was sealed and the reactor vessel heated with the jacket temperature initially set at 120° C. As the temperature of the product approached 70° C. the jacket temperature was increased to 140° and the stirring rate was increased to 70 rpm.

e) The product was stirred for four hours while maintaining the product temperature below 120° C. to avoid degradation of the copolymer. After this period the product was sampled to see that it was clear and free from undissolved copolymer. The product was then cooled to 100° C. and then dropped to an adjustment tank.

f) Additional solvent comprising:

| | |
|---|---|
| xylene solvent | 1500.0 kg |
| diesel oil | 1500.0 kg | were added to the product in the adjustment tank and the resultant mixture stirred until homogeneous. The product was sampled and the solids content adjusted to 14–15% by weight.

g) The product was then run-off into drums via an in-line filter.

(iii) Production of Emulsion.

The blending facility 10 shown in FIG. 1 is designed to blend together diesel oils and alcohol and/or water to form an AW/D emulsion. The emulsion is maintained by the emulsifier and a coupling agent already described.

Diesel oil is held in storage tank 11 and is pumped through line 12 by a pump 13 to a first static in-line mixer 14. The coupling agent is a block copolymer of styrene and butadiene dissolved in a reaction solvent, it is stored in a stirred container 15. A metering pump 16 meters the coupling agent through line 17 into the diesel oil conveying line 12 up-stream of the first static in-line mixer 14. The first static in-line mixer 14 serves to ensure a homogeneous solution of the coupling agent in the diesel oil.

Alcohol and/or water is stored in a tank 18. The alcohol and/or water is pumped from the tank 18 by pump 19 through line 21, including a flow control valve 22, to a second static in-line mixer 23 and then to the line 12 down-stream of the first static in-line mixer 14 and up-stream of a third static in-line mixer 28. The emulsifier is a polyethylene oxide-polystyrene copolymer dissolved in a reaction solvent (or in hydrated alcohol) and is stored in a stirred tank 24 which is maintained at between 35 and 40° C. by heating coil 25. The emulsifier is pumped by metering pump 26 along line 27 into line 21, which it enters downstream of the second mixer 23. The mixer 23 serves to ensure a homogeneous solution of the emulsifier in the alcohol and/or water. The combined flow of line 12 is then passed through the third static in-line mixer 28.

The homogeneous liquid mixture in line 12 emerging from the third in-line mixer 28 is passed through a fixed displacement pump 29 which has a pressure rise of about 15 bar. The pump 29 conveys the liquid mixture to an in-line static high shear disperser 31 where the emulsion is formed. The emulsion is then passed through a final static in-line mixer 32 and directed through line 33 to a storage tank 34.

If the installation 10 is designed to produce 50 cubic meters per hour of emulsion containing 10% by volume of hydrated ethanol then the pump 13 is operated to pump the diesel oil at approximately 44 cubic meters per hour. The solution of the coupling agent is metered into the diesel at from 0.30 to 0.58 cubic meters per hour by the metering pump 16. The hydrated ethanol flow is controlled by the flow control valve to 5 cubic meters per hour. Metering pump 26 pumps the solution of the emulsifier, as a 50% solids solution in xylene reaction solvent, into the alcohol and/or water at a rate of from 0.42 to 0.48 cubic meters per hour.

(iv) Susceptibility of Emulsions to Stratification.

Emulsions comprising 15% by volume of hydrated ethanol, being the dispersed phase, and diesel oil, being the continuous phase, were tested for stratification. The emulsions were stabilised with an emulsifier comprising a polyethylene oxide-polystyrene copolymer (PEOPS) and a coupling agent comprising a polystyrene-polybutadiene copolymer (PSPB). In each case the total weight of the emulsifier and coupling agent together was 9 grams per liter of emulsion. The weight ratio of the PEOPS to the PSPB was varied and the effect of this change correlated with the propensity of the emulsion to stratify.

Figure 2:
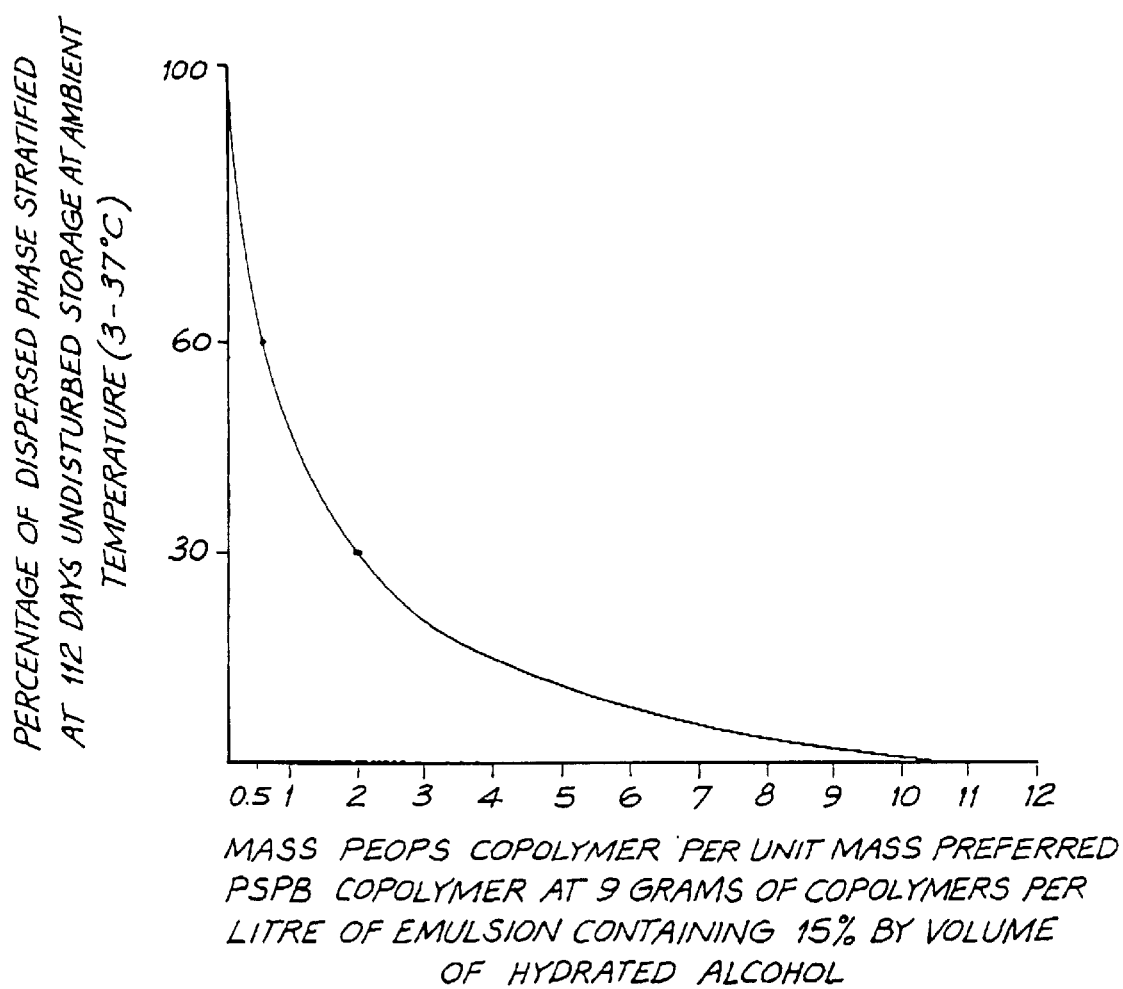
FIG. 2 is a graph showing the way in which the percentage stratification of the dispersed phase of an AW/D emulsion changes as the weight ratio of emulsifier to coupling agent changes.

The propensity of the emulsions to stratify was determined by measuring the percentage of dispersed phase that had stratified at 112 days of undisturbed storage at ambient temperature. The results are shown in FIG. 2. It can be seen that the propensity of the emulsions to stratify reduces significantly above a weight ratio of PEOPS to PSPB of 3:1. Similar results are obtained with total amounts of the emulsifier and coupling agent in the range of 5 to 8 gm/l.

It will be appreciated by persons skilled in the art that numerous changes may be made to the specific embodiments described without departing from the spirit or scope of the invention as broadly described. The present embodiments are, therefore, to be considered in all respects as illustrative and not restrictive.

What is claimed is:

1. An emulsion containing in a continuous phase a hydrocarbon liquid and in a dispersed phase alcohol and/or water in the presence of:
   (a) an emulsifier being a copolymer containing at least one relatively hydrophobic polymeric block of at least one monomer selected from the group comprising styrene and ring substituted styrenes, and at least one relatively hydrophilic polymeric block of at least one monomer selected from the group having the formula $H(O-R)_n OH$ where R is an aliphatic radical containing from 1 to 4 carbon atoms and n is a number between 20 and 300, and
   (b) a coupling agent being a copolymer containing at least one polymeric block of at least one monomer selected from the group comprising styrene and ring substituted styrenes, and at least one block being a saturated or unsaturated aliphatic hydrocarbon moiety, the emulsifier and the coupling agent being present in the emulsion in a weight ratio of greater than 3.0:1, with the emulsifier being present in an amount sufficient to form micelles of the relatively hydrophilic polymer block sufficient to contain the dispersed phase and the coupling agent being present in an amount that is sufficient to substantially prevent the dispersed phase droplets from coalescing while not being present in a sufficiently high amount that micelles of the styrene containing polymeric blocks of the coupling agent form in the continuous phase of the emulsion.

2. An emulsion as claimed in claim 1, in which the amount of the coupling agent in the emulsion is in the range of from 0.75 to 1.5 gm/l.

3. An emulsion as claimed in claim 2, in which the dispersed phase contains hydrated methanol and in which the amount of the coupling agent in the emulsion is in the range of from 0.75 to 1.0 gm/l.

4. An emulsion as claimed in claim 2, in which the dispersed phase contains hydrated ethanol and in which the amount of the coupling agent in the emulsion is in the range of from 1.0 to 1.5 gm/l.

5. An emulsion as claimed in claim 1, in which the total copolymer content of the emulsion is in the range of from 4 to 10 gm/l.

6. An emulsion as claimed in claim 5, in which the dispersed phase contains hydrated methanol and in which the total copolymer content of the emulsion is in the range of from 4 to 6 gm/l.

7. An emulsion as claimed in claim 5, in which the dispersed phase contains hydrated ethanol and in which the total copolymer content of the emulsion is in the range of from 5 to 8 gm/l.

8. An emulsion containing in a continuous phase diesel oil and in a dispersed phase a hydrated alcohol in the presence of:
   (a) an emulsifier being a copolymer containing at least one relatively hydrophobic polymeric block of styrene monomer, and at least one relatively hydrophilic polymeric block of ethylene oxide having a molecular weight between 1,000 and 10,000, the polyethylene oxide and the polystyrene being present in a weight ratio of from 1:0.8 to 1:1.5, and
   (b) a coupling agent being a copolymer containing at least one polymeric block of styrene monomer and at least one block being polybutadiene, the polystyrene and the polybutadiene being present in a weight ratio of from 1:0.3 to 1:1, the emulsifier being present in an amount sufficient to form micelles of the relatively hydrophilic polymer block sufficient to contain the dispersed phase and the coupling agent being present in an amount of from 0.75 to 1.5 gm/l that is sufficient to substantially prevent the dispersed phase droplets from coalescing while not being present in a sufficiently high amount that micelles of the styrene containing polymeric blocks of the coupling agent form in the continuous phase of the emulsion, the emulsifier and the coupling agent being present in the emulsion in a weight ratio of from 3.5:1 to 10:1.

9. An emulsion as claimed in claim 1, in which the emulsifier and the coupling agent are present in the emulsion in a weight ratio of from at least 3.5:1 to 10:1.

10. An emulsion as claimed in claim 1, in which the hydrocarbon liquid is selected from the group comprising gasolines, kerosenes, diesel oils, gas oils and fuel oils.

11. An emulsion as claimed in claim 1, in which the hydrocarbon liquid is a diesel oil.

12. An emulsion as claimed in claim 1, in which the dispersed phase of the emulsion comprises a hydrated alcohol which contains from 0.1 to 10% by volume of water.

13. An emulsion as claimed in claim 1, in which the dispersed phase of the emulsion contains a hydrated alcohol and comprises between 10 and 30% by volume of the emulsion.

14. An emulsion as claimed in claim 1, in which the emulsifier is a copolymer containing at least one polymeric block of at least one monomer selected from the group comprising styrene and ring substituted styrenes and at least one polymeric block of at least one monomer selected from the group having the formula $H(O-R)_n OH$, where R is an aliphatic bivalent hydrocarbon radical containing from 1 to 4 carbon atoms and n is a number between 22 and 130.

15. An emulsion as claimed in claim 1, in which the emulsifier is a pure diblock copolymer or a reaction mixture containing principally di-block copolymer and tri-block copolymer having two blocks of the styrene monomer, together with some unreacted homopolymer of the $H(O-R)_n$ OH monomer.

16. An emulsion as claimed in claim 1, in which the emulsifier is a polyethylene oxide-polystyrene copolymer.

17. An emulsion as claimed in claim 16, in which the polyethylene oxide block has a molecular weight of between 1,000 and 10,000.

18. An emulsion as claimed in claim 16, in which the polyethylene oxide and the polystyrene are present in a weight ratio of 1 part of polyethylene oxide to from 0.8 to 1.5 parts of polystyrene.

19. An emulsion as claimed in claim 16, in which the emulsifier is produced by the reaction of styrene monomer with polyethylene oxide homopolymer in the presence of a free radical initiator.

20. An emulsion as claimed in claim 1, in which the coupling agent is a copolymer containing at least one polymeric block of at least one monomer selected from the group comprising styrene and ring substituted styrenes and at least one polymeric block of at least one compound selected from the group butadiene and isoprene.

21. An emulsion as claimed in claim 1, in which the coupling agent is a pure diblock copolymer or a tapered block copolymer.

22. An emulsion as claimed in claim 1, in which the coupling agent contains styrene and the aliphatic hydrocarbon in the weight ratio of from 1:0.3 to 1:1.

23. An emulsion as claimed in claim 1, in which the coupling agent has a molecular weight of from 100,000 to 170,000.

24. An emulsion as claimed in claim 1, in which styrene comprises from 50 to 77% by weight of the coupling agent.

25. An emulsion as claimed in claim 24, in which the aromatic content of the continuous phase is less than 22% and in which styrene comprises from 50 to 60% by weight of the coupling agent.

26. An emulsion as claimed in claim 24, in which the aromatic content of the continuous phase is more than 23% and in which styrene comprises from 60 to 70% by weight of the coupling agent.

* * * * *